Oct. 6, 1970  O. E. MEYER  3,532,954
KERF COMPENSATION APPARATUS FOR AN ANALOG MOTOR
CONTROLLED CUTTING MACHINE
Filed June 20, 1968  2 Sheets-Sheet 1
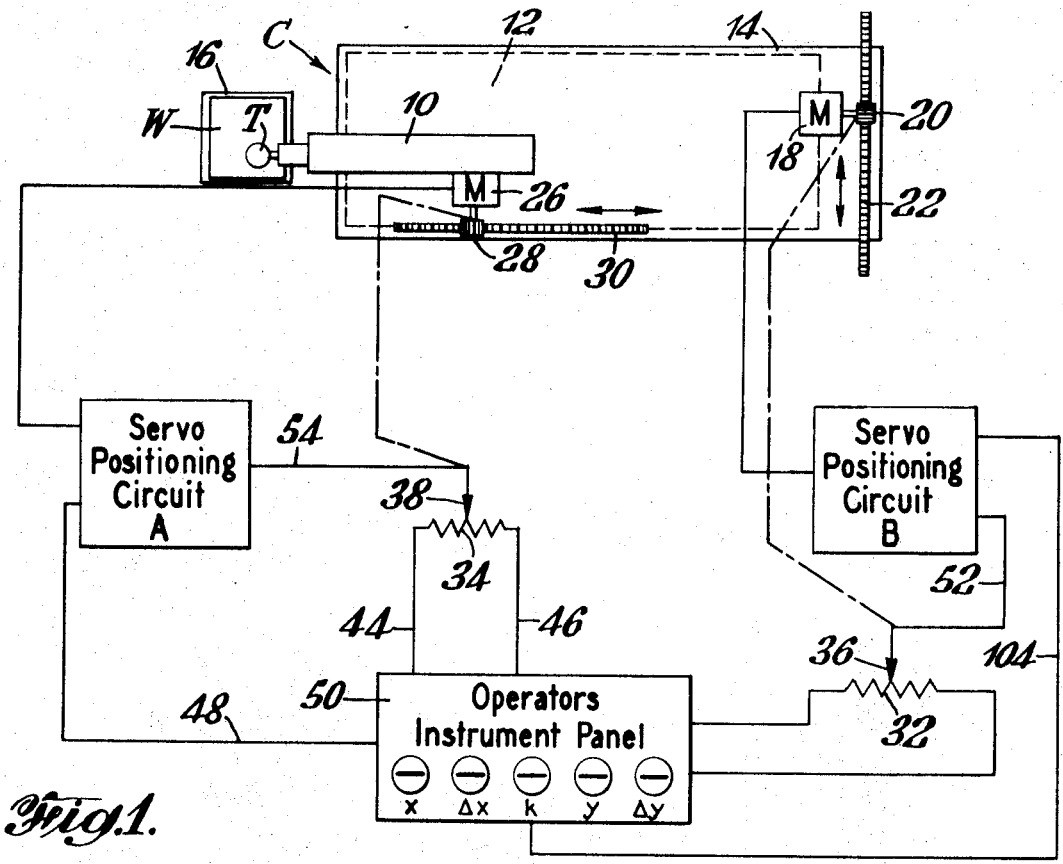
Fig. 1.
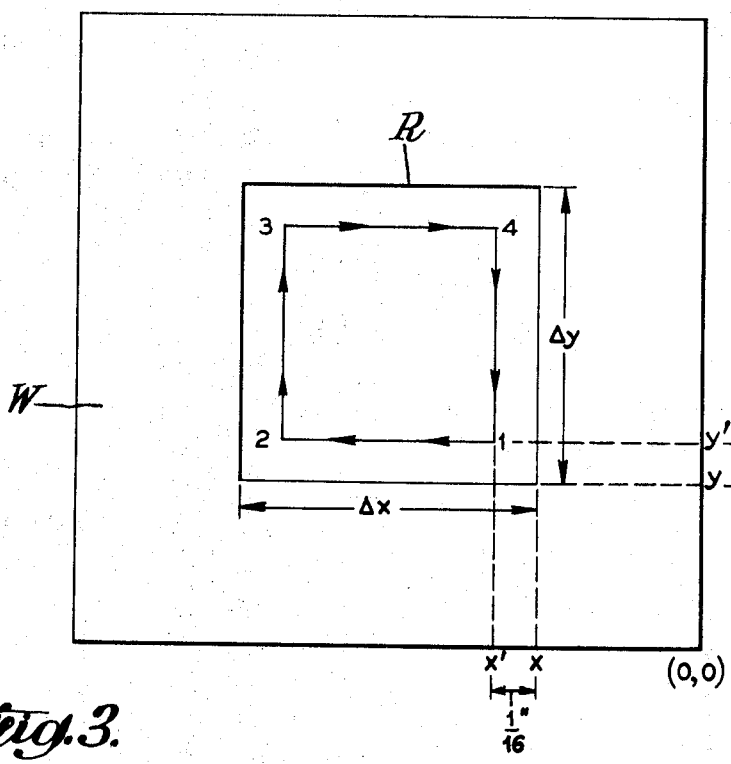
Fig. 3.
INVENTOR
ORRIN E. MEYER
BY
ATTORNEY

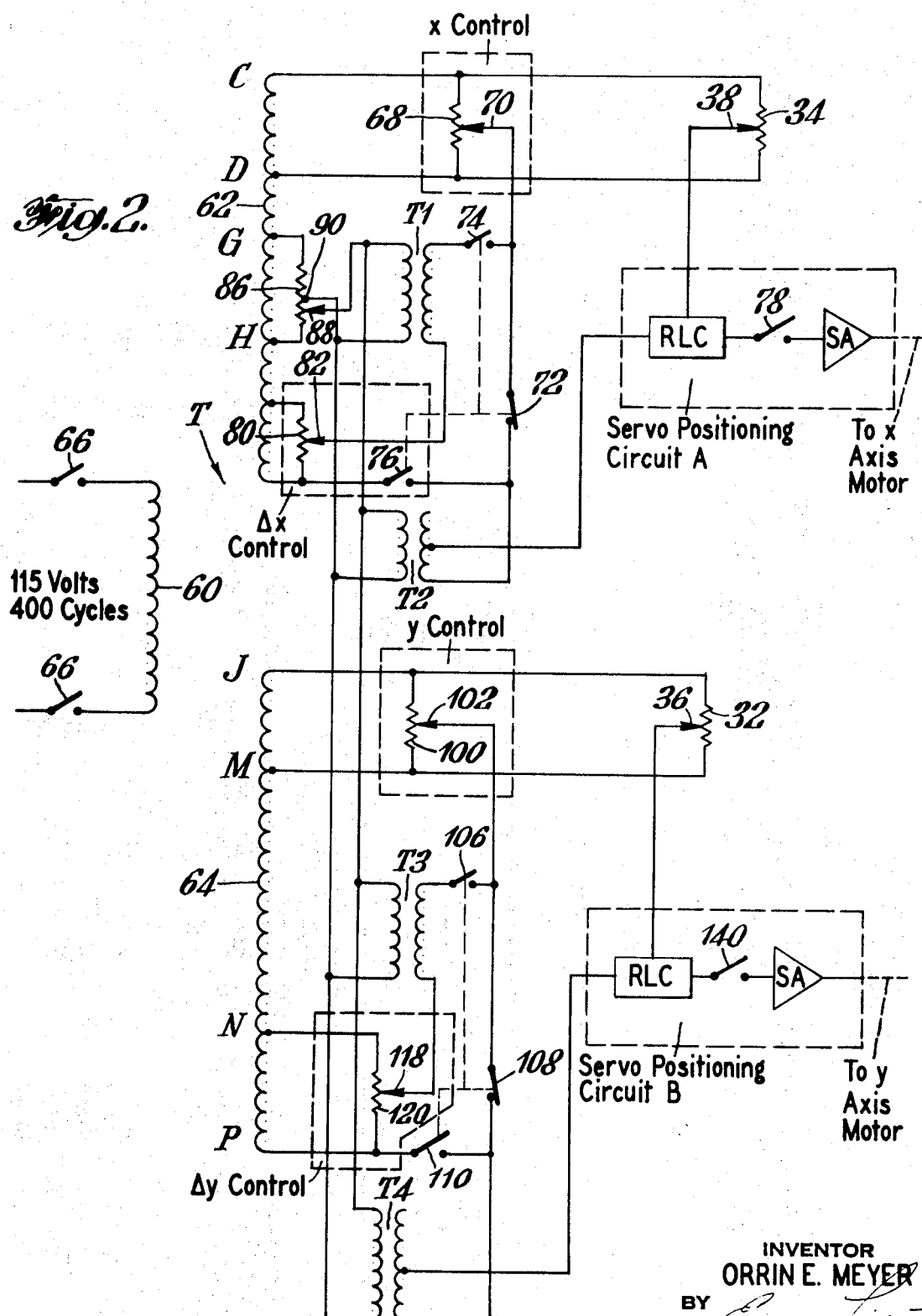

United States Patent Office 3,532,954
Patented Oct. 6, 1970

3,532,954
KERF COMPENSATION APPARATUS FOR AN ANALOG MOTOR CONTROLLED CUTTING MACHINE
Orrin E. Meyer, Union, N.J., assignor to Union Carbide Corporation, a corporation of New York
Filed June 20, 1968, Ser. No. 738,473
Int. Cl. G05b 19/18
U.S. Cl. 318—572                                                 1 Claim

ABSTRACT OF THE DISCLOSURE

Apparatus for automatically compensating for kerf width in an analog controlled cutting machine of the dual carriage type comprising a plurality of transformers interconnected in such a manner to provide a signal voltage of appropriate polarity which will increase or decrease the command signals for moving the carriages by an amount equal to the kerf width of the cutting tool.

---

This invention relates to cutting machines for generating rectangular configurations and more particularly to apparatus for automatic kerf compensation.

A dual carriage cutting machine is ideally suited for developing rectangular shapes. The two carriages are individually powered and can be independently controlled through separate closed loop servo systems by analog control. Analog control of a cutting machine of the dual carriage type is known in the art. In such a system each carriage is confined to movement along one rectilinear axis. The upper carriage is driven transversely along the $x$ axis coordinate while the lower carriage is driven longitudinally along the $y$ axis coordinate. Each carriage includes a separate motor drive energized through an independent servo control system. Command signals representing the desired distance of travel for each coordinate are applied by the operator from the operator's instrument panel.

Prior to the present invention the operator was required as a condition precedent to operation to make a preliminary adjustment for the width of the cut as determined by the physical dimension of the cutting tool employed. For flame cutting, a dimensional allowance was made for the width of the cutting gas stream. The width of the cutting gas stream or cutting tool is hereinafter referred to as the kerf width.

The preliminary adjustment was made by appropriately adjusting the command signals such that the signals applied would represent the desired distance of travel for each coordinate plus or minus the appropriate kerf depending upon whether an inside or outside cut was to be made. Not only is this time consuming and an increased burden on the part of the operator, but it requires mathematical calculations which frequently result in error.

The present invention provides novel apparatus for automatically compensating for kerf width in an analog controlled cutting machine of the dual carriage type when employed to generate square or rectangular shapes.

The kerf compensating apparatus of the present invention converts automatically and electrically the original command signals applied by the operator into new command signals which will cause the center of the cutting tool to travel a distance one kerf width more for an outside cut or one kerf width less for an inside cut than the desired dimension along each coordinate.

Accordingly, the principal object of the invention is to provide an improved analog control system for a dual carriage cutting machine which incorporates automatic kerf compensation apparatus.

In the drawings:

FIG. 1 is a schematic illustration of the dual carriage cutting machine for generating rectangular configurations in combination with the electrical control apparatus for operating the machine.

FIG. 2 is a detailed circuit diagram of the kerf compensation apparatus of the present invention in combination with the analog control circuitry.

FIG. 3 is a pictorial representation of a rectangle to be generated in accordance with the present invention.

Referring to FIG. 1 a rectangular cutting machine C is schematically shown having an upper or transverse carriage 10 and a lower or longitudinal carriage 12. A cutting torch T is connected to the upper carriage 10 which is mounted on lower carriage 12 which is in turn mounted on a cutting table frame 14. The carriages 10 and 12 are movable at right angles to each other along the $x$ and $y$ axis respectively. Workpiece W is mounted on support table 16 located beneath torch T. Lower carriage 12 is driven longitudinally along the $y$ axis by lower carriage drive motor 18. A pinion 20 is mounted on the shaft of lower carriage drive motor 18 and engages rack 22 for causing movement of lower carriage 12 along the $y$ axis upon energization of drive motor 18.

Similarly, upper carriage 10 is driven transversely along the $x$ axis by means of upper carriage drive motor 26 which is geared through a pinion 28 mounted on its shaft to a rack 30 on the cutting machine lower carriage 12. Upon the energization of motor 26 upper carriage 10 moves transversely along the $x$ axis relative to lower carriage 12.

The physical length of rack 22 on cutting machine table frame 14 and of rack 30 on lower carriage 12 determines the total distance of travel of lower carriage 12 along the $y$ axis and upper carriage 10 along the $x$ axis respectively, and as such, the total travel length of torch T along each of the two coordinates. Associated with rack 22 is an A.C. potentiometer 32 and with rack 30 an A.C. potentiometer 34. Potentiometer 32 is wound with a predetermined number of turns, such that a direct relationship is provided between the total number of turns and the length of rack 22. The wiper arm 36 of potentiometer 32 is mechanically linked to the shaft of lower carriage drive motor 18 in a manner such that wiper arm 36 slides along potentiometer 32 from one end thereof to the opposite end as the shaft of motor 18 moves relative to rack 22. Since the position of torch T upon workpiece W in the $y$ axis direction depends upon the position of the shaft of motor 18 with respect to rack 22, a direct corelationship exists between the torch position along the $y$ axis and the position of wiper arm 36. Potentiometer 32 is connected through conductor leads 40 and 42 to the operator's instrument panel. An alternating voltage is impressed across potentiometer 32 from the operator's instrument panel 50 as will be more fully described hereafter. The voltage impressed across potentiometer 32 is arbitrarily chosen to represent the entire length of travel of lower carriage 12 and as such the total travel distance of torch T along the $y$ axis. Accordingly, the voltage output at wiper arm 36 will represent the actual position of torch T along the $y$ axis.

Similarly, potentiometer 34, associated with rack 30, is wound with a predetermined number of turns such that a direct relationship exists between the total number of turns and the length of rack 30. The wiper arm 38 of potentiometer 34 is mechanically linked to the shaft of upper carriage drive motor 26 in a manner such that the wiper arm 38 slides along potentiometer 34 from one end thereof to the opposite end as the shaft of motor 26 moves from one end to the opposite end of rack 30. Since the position along the $x$ axis of torch T upon workpiece W depends upon the position of the shaft of motor 26 with respect to rack 30, a direct corelationship exists between the torch position along the x axis and the position of wiper arm 38. Potentiometer 34 is connected through conductor leads 44 and 46 to the operator's instrument panel 50 which causes a predetermined alternating voltage to be impressed thereacross. The voltage impressed across the potentiometer 34 is arbitrarily chosen to represent the total movement of upper carriage 10 and thereby the total distance of travel of torch T in the x direction. Accordingly, the voltage at wiper arm 38 will represent the actual position of torch T along the x axis.

Servo positioning circuit A receives as one input signal the output voltage of wiper arm 38 by means of conductor 54. A second input signal or command signal is applied from the operator's control panel 50 through conductor 48. The output of servo positioning circuit A is fed to upper carriage drive motor 26 to control its energization and deenergization. Similarly, servo positioning circuit B receives as one input signal the output voltage of wiper arm 36 by means of conductor 52. A second input signal or command signal is applied from the operator's control panel 50 through conductor 104. The output signal of servo positioning circuit B is fed to lower carriage drive motor 18 to control its energization and deenergization.

Servo positioning circuits A and B act as null detectors driving respectively drive motors 18 and 26 until the input voltages to each of the servo circuits are equal. Each servo circuit comprises a conventional rate limit control circuit and a conventional servo amplifier. The rate limit control circuit provides a constant output signal to the servo amplifier for all differential input signals, above zero, irrespective of the magnitude of such signals. Thus servo positioning circuit A operates upon the voltage differential between conductor 54 and conductor 48. If the voltages are unequal drive motor 26 will energize and be driven at a constant rate moving the torch T along the x axis coordinate until the input differential voltage is reduced to zero at which time the drive motor 26 will deenergize. Likewise, servo positioning circuit B will cause the drive motor 18 to energize moving lower carriage 12 and as such torch T along the y coordinate until the voltage between conductors 52 and 104 are equal at which time drive motor 18 will deenergize.

Cutting machine C is operatively controlled by means of the operator's instrument panel 50. Located on the operator's instrument panel 50 in a series of control knobs, $x$, $\Delta x$ $y$, $\Delta y$ and $k$ which are selectively adjustable by the operator for supplying command signals to servo positioning circuits A and B respectively. As hereinbefore mentioned the command signals are compared by the servo positioning circuits A and B to the signal voltage of wiper arm 38 and 36 respectively. The command signals are applied sequentially to the servo positioning circuits A and B through circuitry in the operator's control panel 50 so that torch T moves along only one coordinate at at time. The sequencing operation can be clockwise or counterclockwise i.e. the torch commanded to travel first in the y direction and then in the x direction or vice versa. The control knobs are calibrated in inches representing torch travel distance along the x and y axis respectively.

Referring now to a detailed description of the apparatus shown in FIG. 2. Input transformer T includes primary winding 60 and multi-tap seconding windings 62 and 64. Secondary windings 62 and 64 are wound with an equal number of turns so that an indentical voltage is impressed across each secondary. The primary winding 60 is energized from a conventional 115 volt 400 cycle A.C. source upon closing main line switch 66. The x and $\Delta x$ controls derive their command signal voltages from secondary winding 62. Wiper arm 70 of A.C. potentiometer 68 represents the x control which is manually adjustable by the operator. A.C. potentiometer 68 is connected across tap points C and D of secondary winding 62.

Connected in parallel with A.C. potentiometer 68 is A.C. potentiometer 34. As earlier stated, the voltage impressed across A.C. potentiometer 34 represents the total torch travel distance in the x direction while the voltage provided from wiper arm 38 of A.C. potentiometer 34 represents the exact location of torch T in the x direction. Wiper arm 70 or the x control provides a signal voltage to the servo positioning circuit A which is compared to the signal voltage provided by wiper arm 38. The upper carriage 10 is moved along the x axis varying wiper arm 38 until the voltage inputs to servo positioning circuit A are equal. The signal voltage provided by wiper arm 70 may be applied directly to servo positioning circuit A or in series relation to that of wiper arm 82 of A.C. potentiometer 80. The wiper arm 82 represents the $\Delta x$ control and is also manually adjustable by the operator. The kerf compensation control K shown on the operator's instrument panel is represented by wiper arm 88 of A.C. potentiometer 86. A.C. potentiometer 86 is connected across tap points G and H of secondary winding 62 so that the voltage impressed thereacross is in proper synchronism with the voltages impressed across the x and $\Delta x$ control potentiometers. The A.C. potentiometer 86 has a center tap point 90 which provides a reference for variable wiper arm 88. Variable wiper arm 88 is adjustable by means of control K to a position above or below center tap point 90 to provide a positive or negative output voltage. Variable wiper arm 88 is connected to one end of the primary of transformers T1, T2, T3 and T4 respectively, the other end of the primary of transformers T1, T2, T3 and T4 being connected in common to the center tap reference point 90 of A.C. potentiometer 86. Transformers T1 and T2 provide, through the manual adjustment of control K, a voltage in series aiding or series opposing relationship to the x and $\Delta x$ command voltages which results in decreasing or increasing the travel distance of torch T along the x axis by an amount equivalent to the setting of the kerf width control. The kerf width control K on the operator's instrument panel is calibrated in fractions of a kerf width corresponding to different torch nozzle sizes for both an outside and inside cut. For an outside cut using a 1/8" torch nozzle the wiper arm 88 is adjusted by control K to a predetermined position above center tap reference point 90 such that the output voltage across the secondary of transformers T1 and T2 is equivalent to a torch movement of 1/8 inch. Where 40 volts represents the entire torch travel distance along the x axis, a distance of for example 200 inches, the voltage across the secondary of transformers T1 and T2 would be .025 volt. The output across transformer T1 is equivalent to one kerf width while that across transformer T2 is equivalent to one half kerf width since the output is taken across only one half of the secondary of transformer T2.

The y and $\Delta y$ controls derive their command signal voltages from secondary winding 64. Wiper arm 102 of A.C. potentiometer 100 represents the y control and wiper arm 118 of A.C. potentiometer 120 the $\Delta y$ control, being independently adjustable by the operator. A.C. potentiometer 100 is connected across tap points J and M of secondary winding 64. Connected in parallel with A.C. potentiometer 100 is A.C. potentiometer 32 whose wiper arm 36 is varied in accordance with movements of the lower carriage 12 along the y axis. A.C. potentiometer 120 is connected across tap points N and P of secondary winding 64. Servo positioning circuit B compares the signal voltage provided by wiper arm 36 to that of the command voltages of the y and $\Delta y$ controls, causing the lower carriage 12 and as a result the torch T to move along the y axis until the servo circuit input voltages are equal. Kerf compensation is accomplished for the y axis through transformers T3 and T4. Transformers T3 and T4 are connected in parallel with transformers T1 and T2, all receiving the identical control voltages from variable wiper arm 88 of A.C. potentiometer 86 with reference to center point 90. In this way, the kerf control K on the operator's instrument panel provides a common kerf adjustment for both rectilinear coordinates. The output across the secondary of transformers T3 and T4 will provide a voltage in series aiding or series opposing relationship to the y and Δy control voltages which will result in decreasing or increasing the travel distance of the torch T along the y axis by an amount identical to that along the x axis.

To operate cutting machine C, the operator first sets the workpiece W onto the table support 16. An inside cut is used where the operator is to cut out a rectangular section from the workpiece, the location of which may be critical. The distance between the edge of the rectangle to the corresponding edge of the workpiece for each coordinate determines the proper setting for the x and y controls on the operator's instrument panel. The specific dimensions for the rectangle determines the Δx and Δy control setting respectively. The kerf width control K is adjusted for an inside cut in accordance with the torch nozzle size employed.

FIG. 3 shows a rectangle R of length Δy and width Δx to be generated from workpiece W in accordance with the invention. With the kerf adjustment control set for ⅛ inch kerf and for an inside cut, the centerline of the torch will be directed to follow the path 1–2–3–4–1 defined by the arrows. The torch is initially located at the origin (O, O) of workpiece W. Operation is started by closing main line switch 66 in FIG. 2. Switch 78 in servo positioning circuit A is depressed. The voltage at wiper arm 70, the x control, through normally closed switch 72 will cause the servo positioning circuit A to energize upper carriage drive motor 26 driving torch T to position x in FIG. 3. The voltage across the center tapped secondary of transformer T2 in series aiding relationship will result in an additional movement of torch T to position x'. The distance between position x and x' is equal to one half kerf width or in this instance ¹⁄₁₆ inch. The torch is then moved along the y axis by depressing switch 140 in servo positioning circuit B. The voltage at wiper arm 102, the y control, through normally closed switch 108 will cause the servo positioning circuit B to energize lower carriage drive motor 18 driving torch T to position y while transformer T4 will provide an additional voltage for movement to y'. The distance between y and y' is also one-half a kerf width or ¹⁄₁₆ inch.

Switch 72 is ganged to normally opened switches 74 and 76 while switch 108 is ganged to normally opened switches 106 and 110. The switches are all shown as manually operable switches for the purpose of simplicity. As a practical matter, however, it is advantageous to have all the switches automatically controlled so that they open and close in a timed sequence to provide continuous and smooth operation. This could be accomplished by conventional relay circuitry. Upon reaching the starting point 1 the cutting gas stream of the torch T is turned on by means not shown. Switch 72 is opened simultaneously closing ganged switches 74 and 76 for providing a second input to servo positioning circuit A which includes the voltage from wiper arm 82, or the Δx control, and a compensating voltage from transformer T1 which in this case is in series opposition. The torch is thus commanded to move from position 1 to position 2 in FIG. 3. Position 2 is equal to a movement of Δx inches minus one kerf width. The torch is then moved to position 3 by opening switch 108 which simultaneously closes ganged switches 106 and 110. Servo positioning circuit B then received an additional input signal from wiper arm 118 or the Δy control and a compensating voltage from transformer T3 which is in series opposition thereto. Position 3 is equal to a movement of Δy inches minus one kerf width.

The same procedure is followed from position 3 back to position 1 to complete the rectangle. Here, however, the voltages are reversed to cause movement in the opposite direction. This could be accomplished manually by the use of double pole double throw switches (not shown) to reverse the leads or by automatic switch control through conventional relay circuitry.

It should be emphasized that automatic switching is preferred over the manual switching shown and described but has been omitted since the switching itself forms no part of the present invention and would lengthen the specification unnecessarily.

The kerf compensation control K is variable and is adjusted to an appropriate setting by the operator in accordance with the size of the cutting tool or torch employed and in accordance with whether an inside or outside cut is to be made. The kerf control provides a compensating signal which is always in synchronism with the x and y command signals and is a common control for both the x and y axis.

What is claimed is:

1. In an analog control system for a cutting machine having a transverse and longitudinal carriage supporting a cutting torch for movement in a horizontal plane above a horizontally supported workpiece, a first servo control system for driving said longitudinal carriage along one rectilinear coordinate, a second servo control system for driving said transverse carriage along another rectilinear coordinate, means for supplying command signals to said first and second servo control systems including an input transformer having a primary and secondary winding; a first variable potentiometer connected across part of said secondary winding, the output of said potentiometer representing a command signal voltage for moving said torch a predetermined distance in said transverse direction; a second variable potentiometer connected across a second part of said secondary winding, the output of said second potentiometer representing a command signal voltage for moving said torch a predetermined distance in said longitudinal direction; for generating a rectangular configuration within said workpiece, wherein the improvement comprises: a center tapped variable transformer connected across a third part of said secondary winding for providing a polarity controlled output signal, said polarity controlled output signal being connected to the input of a plurality of additional transformers, said additional transformers having at least two outputs, the magnitude of each of said outputs representing kerf width, one of said outputs being interconnected in series relationship with the output of said first variable potentiometer to provide a resultant kerf compensated command signal equal to the arithmetic summation of each output for said transverse direction, the other of said outputs being interconnected in series relationship with the output of said second variable potentiometer to provide a resultant kerf compensated command signal equal to the arithmetic summation of each output for said longitudinal direction.

References Cited
UNITED STATES PATENTS

| | | |
|---|---|---|
| 3,105,142 | 9/1963 | Tripp. |
| 3,123,657 | 3/1964 | Clark et al. |
| 3,176,120 | 3/1965 | Whitemore et al. |
| 3,188,541 | 6/1965 | Eisengrein et al. |

THOMAS E. LYNCH, Primary Examiner

U.S. Cl. X.R.

318—162